United States Patent [19]

Guichard et al.

[11] Patent Number: 5,061,991
[45] Date of Patent: Oct. 29, 1991

[54] EMISSION-RECEPTION SYSTEM FOR THE TRANSMISSION OF ANIMATED COLOR PICTURES AND SOUND FROM TWO INDEPENDENT CHANNELS

[75] Inventors: Jacques Guichard, Paris; Gérard Eude, Torcy, both of France

[73] Assignee: L'Etat Francais represente par le Ministre des Postes, de Telecommunications et de l'Espace (Centre National d'Etudes des Telecommunications), Issy Les Moulineaux, France

[21] Appl. No.: 513,887

[22] Filed: Apr. 24, 1990

[30] Foreign Application Priority Data

Apr. 28, 1989 [FR] France .................. 89 05713

[51] Int. Cl.$^5$ ........................................... H04N 11/06
[52] U.S. Cl. ....................................... 358/12; 358/85
[58] Field of Search ............... 358/12, 21 R, 134, 85; 379/53, 54

[56] References Cited

U.S. PATENT DOCUMENTS 4,746,979 5/1988 Kashigi ........................ 358/134

FOREIGN PATENT DOCUMENTS 0312434 10/1988 European Pat. Off. .
53-18332 2/1978 Japan ........................... 358/12
54-116834 9/1979 Japan ........................... 358/12
57-159189 10/1982 Japan ........................... 358/12
63-136790 6/1988 Japan .
8802001 6/1988 PCT Int'l Appl. .

OTHER PUBLICATIONS

IEE Transactions on Consumer Electronics (vol. 34, No. 1, Feb. 1988).
Technische Mitteilungen des RFZ (vol. 31, No. 4, 1987).

Primary Examiner—James J. Groody
Assistant Examiner—Kim Yen Vu
Attorney, Agent, or Firm—Hayes, Soloway, Hennessey & Hage

[57] ABSTRACT

The invention relates to a transmission-reception system for the transmission of animated color images or pictures and sound from two independent channels. The image signal is distributed over two independent channels, the luminance signal occupying one channel, while the chrominance signal, which is multiplexed with the sound, occupies with the sound the other channel. Separate luminance and chrominance signal processors are provided.

6 Claims, 4 Drawing Sheets

PRIOR ART
FIG. 1
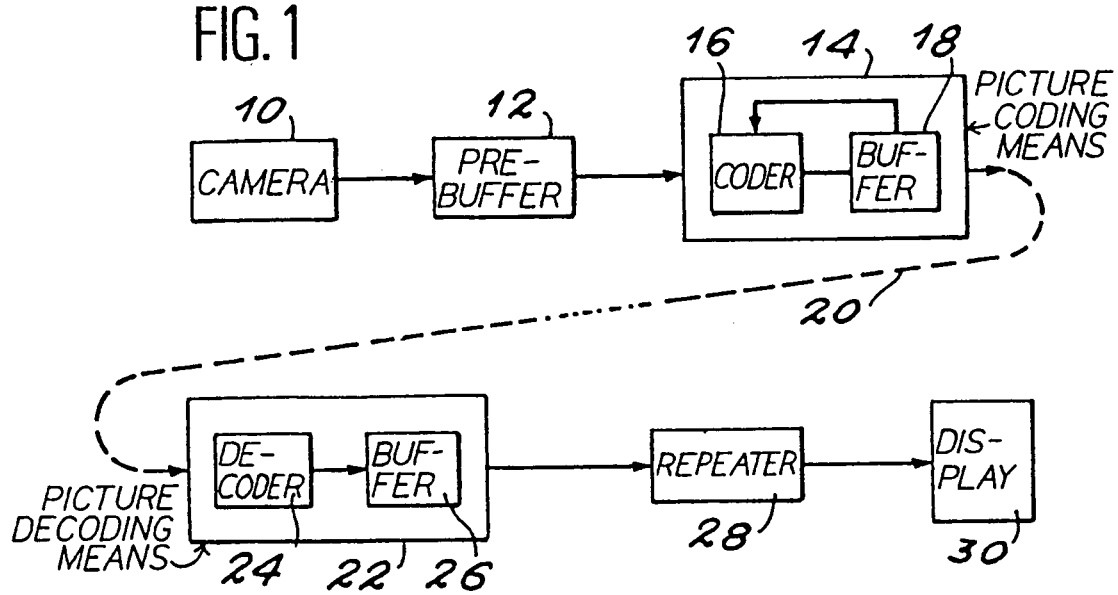
FIG. 2
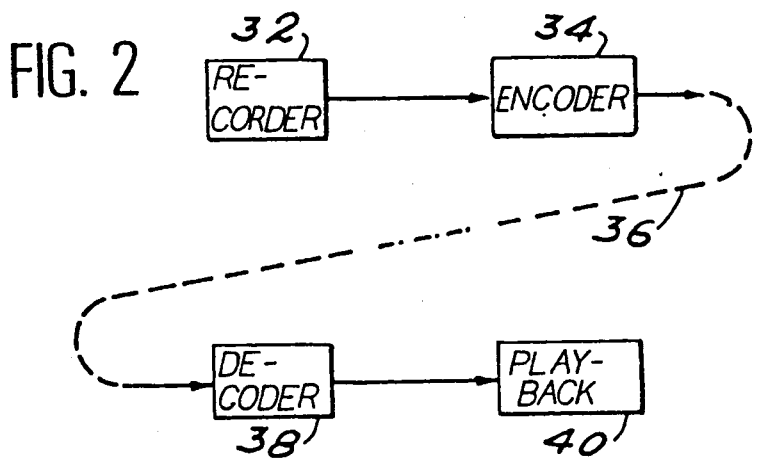
PRIOR ART
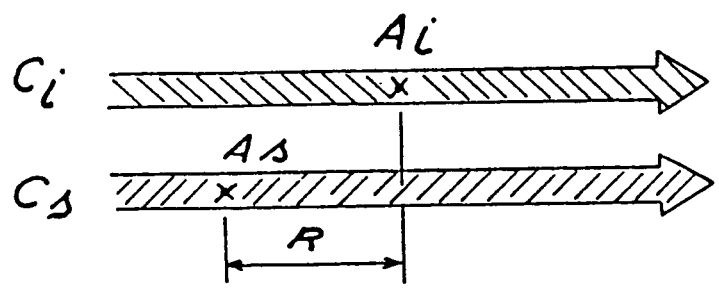
FIG. 3

EMISSION-RECEPTION SYSTEM FOR THE TRANSMISSION OF ANIMATED COLOR PICTURES AND SOUND FROM TWO INDEPENDENT CHANNELS

DESCRIPTION

1. FIELD OF THE INVENTION

The present invention relates to an emission-reception system for the transmission of animated colour images or pictures and sound from two independent channels. It has a general application in the transmission of images or pictures and in particular for services which, in the near future, will be provided by the integrated services digital network (ISDN), such as visioconference, visiomeeting and picturephones.

Thus, the advances made over the last few years in the field of electronic components and signal processors have led to information reduction methods (also called image coding) of an increasingly sophisticated nature. Thus, such advances will make it possible to carry out such services using transmission channels with bit rates as low as 64 kbits/s.

These methods, which make use of various transformations (Hadamard, Haar, cosine, sine, etc.) are described in the article by J. Guichard and D. Nasse entitled "L'image numerique et le codage", published in the journal "L'echo des Recherches", No. 126, fourth quarter, 1986, pp 21-36. A description is also provided in French patent applications 85 15649, 86 07713 and 86 05213.

With regards to the sound, coders or encoders exist which, on the basis of an analog signal, supply binary informations at rates of 64, 56, 48, 32, 16 and so on 8 kbit/s and less. Obviously the quality of the speech transmitted is dependent on the rate and the compression ratio of the coder.

With regards the image or picture, very considerable efforts have been made over the last few years to reduce the rate and at present there are image encoders-decoders at rates of 112, 96, 64, 56, 48 kbit/s, etc. In the same way as for sound, the quality of the pictures observed is dependent on the compression ratio, the format of the initial picture, the coding algorithm and the final flow rate.

With regards to the base access, the rates offered by the integrated services digital network are twice 64 kbit/s for sound and pictures, plus 16 kbit/s for data. The designer of animated picture services consequently has 128 kbit/s for the transmission of picture and sound signals.

These 128 kbit/s are in the form of two channels, which are independent and of 64 kbit/s each, i.e. they take different paths in the network. During communication, informations emitted in phase do not arrive at the same instant at the receiver. The phase displacement in the earth network can be 10 to 20 milliseconds.

This desynchronization problem has led picturephone system designers to use 64 kbit/s for sound and 64 kbit/s for vision, because a phase displacement of ±70 ms between the sound and the movement of the lips is acceptable.

An example of such a system is described hereinafter relative to FIGS. 1, 2 and 3.

FIG. 1 shows a picture processing and transmission means, which comprises:

an emission channel constituted by a camera means 10, a prebuffer 12, which is entered by a picture signal at a certain frequency F and is read at a frequency F/N, said prebuffer supplying a signal corresponding to a picture on N, a picture coding means 14 incorporating a coder 16 and a buffer 18, said means supplying a digital coded picture signal; a transmission line 20;

a reception channel constituted by a decoding means 22 receiving the transmitted coded digital picture signal, said means incorporating a decoder 26 and a buffer 24 and supplying a decoded picture signal at a frequency F/N, a means 28 for repeating N times the decoded picture signal and a means 30 for the display of the pictures restoring the seguences of N identical pictures.

FIG. 2 illustrates a sound processing means comprising an emission channel constituted by a sound recording means 32, a sound encoder 34 supplying a digital sound signal, a transmission line 36 and a reception channel constituted ty a sound decoder 38 and a sound restitution means 40.

The means 10, 12, 14 for the vision or picture channel and 32, 34 for the sound channel constitute what is called an emission assembly. The means 22, 28 and 30 for the image channel and 32, 34 for the sound channel constitute what is called a reception assembly.

These two assemblies operate in parallel and constitute two independent channels, each having a rate of 64 kbit/s. FIG. 3 shows an image channel Ci and a sound channel Cs, which are parallel and identical.

However, in order to reach 64 kbit, the compression ratios of the picture and sound encoders are not of the same order of magnitude. Thus, prior to compression, there is a ratio of approximately one thousand between the pass bands of a video signal and a sound signal.

SUMMARY OF THE INVENTION

The object of the present invention is to obviate the problem of desynchronization, whilst at the same time solving the problem of the transmission of signals having very different compression ratios.

Thus, the present invention relates to a transmission-reception system for the transmission of color images consisting of distributing the image signal over two independent channels, the luminance signal occupying one channel and the chrominance signal grouped with the sound signal the other channel.

The present invention more particularly relates to an emission-reception signal for the transmission of animated colour pictures and sound from two independent channels comprising:

(A) an emission assembly constituted by image processing means having a camera means and image encoding means; sound processing means incorporating a sound recording means and sound encoding means, (B) a reception assembly constituted by image processing means incorporating encoding means receiving the transmitted encoded digital signal, image display means and sound processing means incorporating sound encoding and restitution means, (C) a transmission assembly incorporating means for the transmission of the digital signal supplied by the emission assembly, characterized in that:

(A) in the emission assembly, the image processing means have independent processing channels, one for the luminance signal and the other for the chrominance signal, the sound signal and the chrominance signal being multiplexed;

(B) in the reception assembly, the image processing means have independent processing channels, one for the luminance signal and the other for the chrominance signal, the sound signal and the chrominance signal being demultiplexed;

(C) in the transmission assembly, the transmission means have two independent transmission channels, whereof one makes it possible to transmit the luminance signal and whereof the other makes it possible to transmit the multiplexed chrominance and sound signals; and characterized in that the luminance signal and chrominance signal of an image, emitted in phase, are processed on reception in order to be applied to phase display means.

DETAILED DESCRIPTION OF THE PREFERRED EMBODIMENTS

The invention is described in greater detail hereinafter relative to non-limitative embodiments and the attached drawings, wherein show:

FIG. 1, already described, an emission-reception assembly for the transmission of pictures according to the prior art.

FIG. 2, already described, an emission-reception assembly according to the prior art.

FIG. 3, already described, two image aod sound channels for the transmission of images and sound according to the prior art.

Figure 4:
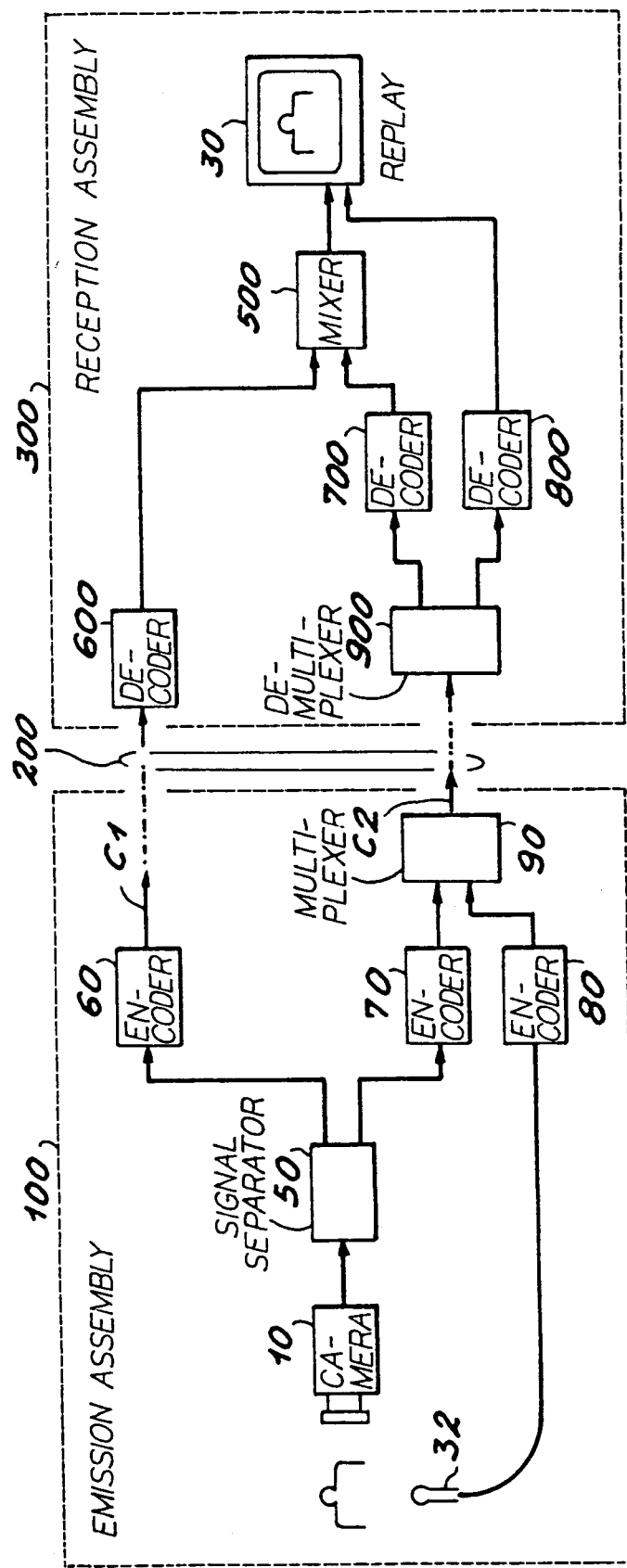

FIG. 4, an emission-reception assembly for the transmission of image and sound signals according to the invention.

Figure 5:
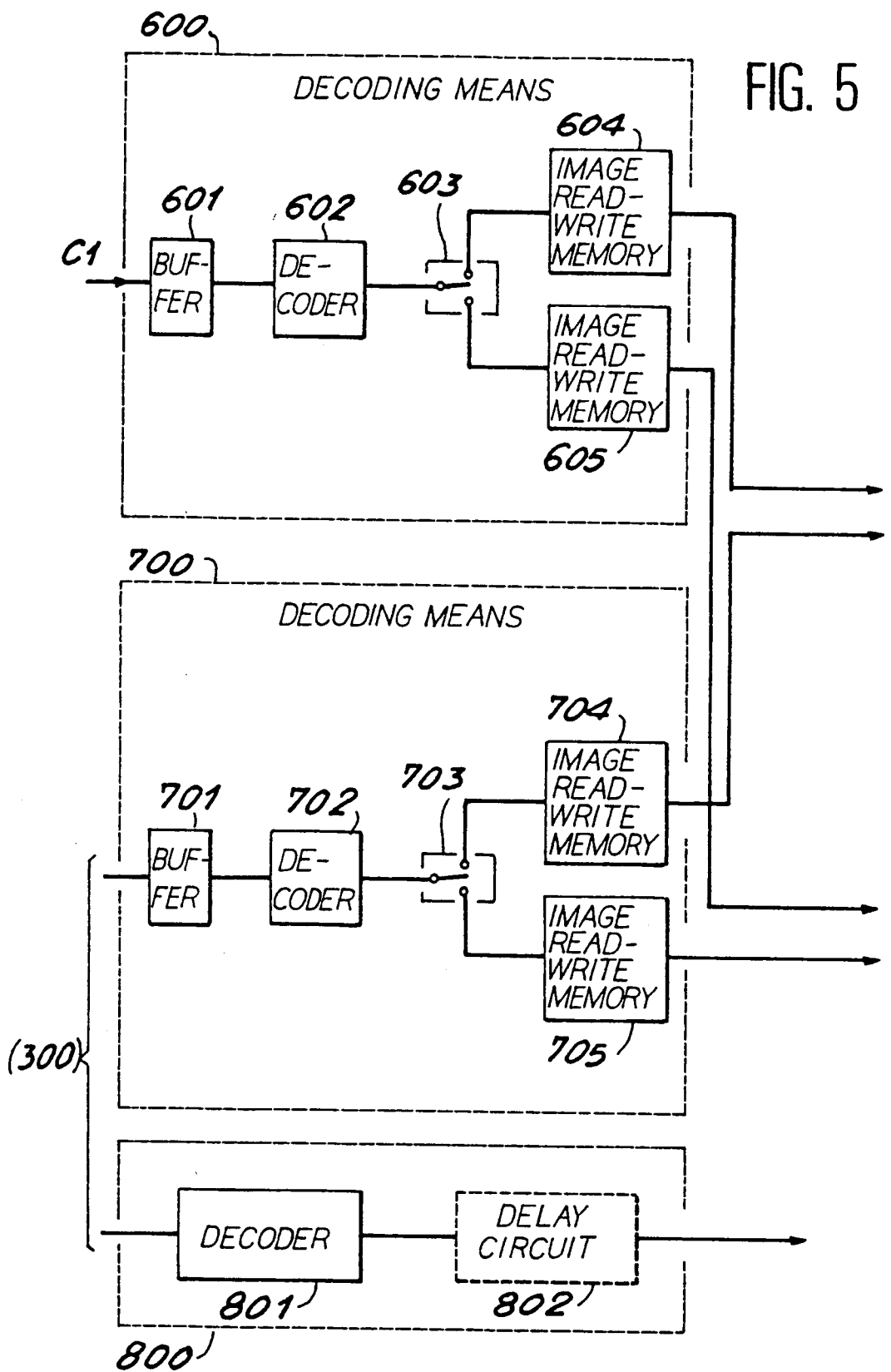

FIG. 5 a detailed constructional example of the encoding means for the luminance, chrominance and vision signals according to the invention.

Figure 6:
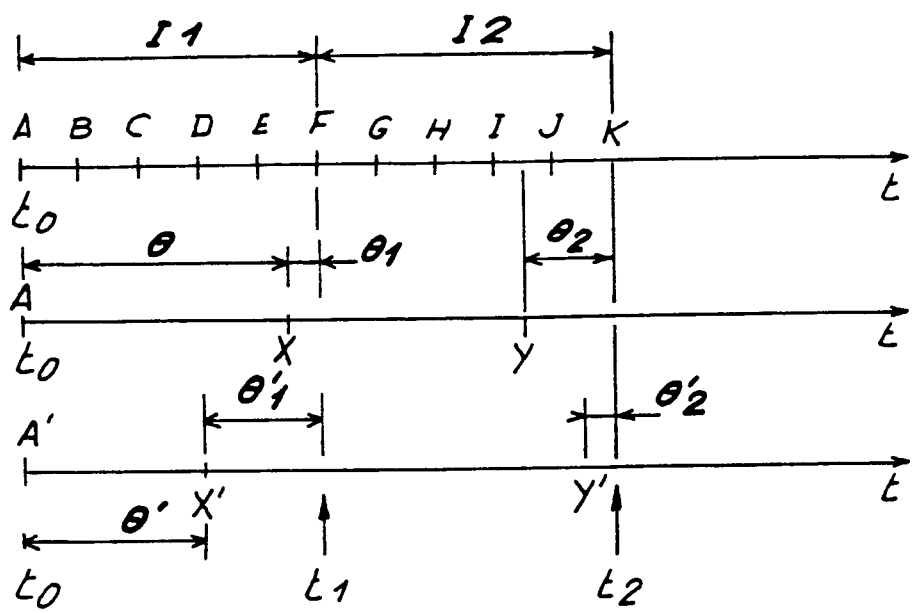
Figure 7:
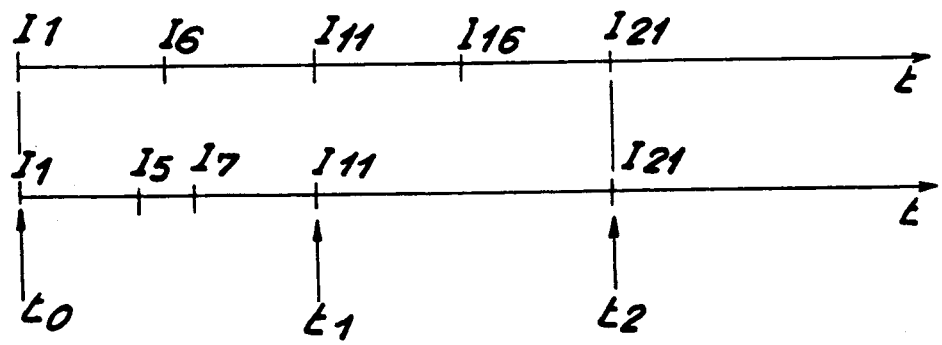

FIGS. 6 and 7 a diagram illustrating the performance of the processing on reception, according to first and second embodiments respectively. The diagram shcwn in FIG. 4 represents that of an emission-reception system for the transmission of sound and animated color picture signals according to the invention.

The system comprises an emission assembly 100 differing from the prior art assembly by the fact that it has a luminance and chrominance signal separator 50, by the fact that the image processing means have two processing channels, one for the luminance signal and the other for the chrominance signal and by the fact that the chrominance signal processing channel is combined with the sound processing channel in order to multiplex these two signals on the same transmission channel C2.

Each processing channel of the signal, no matter whether it is the sound channel, the luminance channel or the chrominance channel, has encoding means 60, 70, 80 supplying digital signals. The output signals of the encoding means 70 and 80 are multiplexed by means of a multiplexer 90. The digital output signal of the encoding means 60 occupies a channel C1. In the example of a system applicable to picturephones the channels C1 and C2 are 64 kbit/s channels. The transmission means are e.g. constituted by transmission lines 200.

The system also has a reception assembly 300, which differs from the prior art assembly by the fact that it comprises a luminance and chrominance signal mixer, ty the fact that the image processing means incorporate two processing channels, one for the luminance signal and the other for the chrominance signal and by the fact that a demultiplexer makes it possible to restitute the chrominance signal separately from the sound signal.

According to a feature of the invention, the decoding means 600, 700 incorporate conventional image deccders, but in which advantages taken of the variable times for decoding an image for absorbing the delay of approximately 10 to 20 milliseconds which can occur between the signals from two independent channels C1 and C2. Thus, the luminance and chrominance signals are synchronized at the time of the display of the complete picture, the sound signal being synchronous with the chrominance signal.

This synchronization takes place on all the pictures according to a first variant consisting of emitting the same number of luminance and chrominance images, or images emitted in phase according to a second variant consisting of emitting more color images. The synchronization is then obtained on a mean or average basis (luminance and chrominance images emitted in phase e.g. on every other occasion, which is the case when the luminance images are emitted on the 10 Hz base and the chrominance images on the 25 Hz base). This second variant makes it possible to deliver more color images for a "black and white" image and consequently to give the illusion of a continuous movement. On average, it can obviously retain the advantages of the separate luminance and chrominance processing, i.e. permitting an absorption of the delay of the signals between the two channels C1 and C2.

FIG. 5 shows a more detailed example of the decoding means of the reception assembly.

The decoding means 600 of the luminance signal from channel C1 have a buffer 601, a decoder 602, a switching device 603 and at least two image read-write memories 604, 605.

The decoding means 700 of the chrominance signal are identical to those described hereinbefore and consequently have a buffer 701, a decoder 702, a switching device 703 and at least two image read-write memories 704, 705.

The decoding means of the sound signal essentially incorporate a decoder 801 and a delay or lag circuit 802 (in the case where such a circuit is not provided in the sound signal encoding means). The circuit 802 makes it possible to compensate the image processing time.

The encoding means of the emission assembly are not described in detail, because they can easily be gathered from the reception means, because they carry out a reverse treatnent.

Moreover, the encoding means additionally have not shown analog-digital conversion circuits making it possible to transfonm the luminance and chrominance signals into analog signals.

In the same way, the decoding means also have not shown digital-analog conversion circuits making it possible to transform the luminance and chrominance signals into analog signals.

For the practical realization of the encoders and decoders, reference can be made to French patent application 2 599 577 entitled "Transformation Encoding Process for Image Signal Transmission".

The delay circuit 802 is e.g. formed by a delay line introducing a delay substantially equal to the supplementary time of the image processing.

As has been stated hereinbefore, the delay betweeen the decoding time of a luminance signal and a chrominance signal is used for compensating the delay introduced during transmission on two independent channels.

FIG. 6 is a diagram illustrating the mechanism of the variable delay and the switching times in the case of the first embodiment according to which the "black and white" images or pictures (luminance) are emitted with the same frequency and synchronously with the color images or pictures. The time $t_0$ corresponds to that at which decoders 602, 702 and 802 start to decode.

Each color and "black and white" imagee is repeated (read) N times in order to have a display frequency F, F/N being the decoded (and also encoded) image frequency.

In the case of 64 kbit/s animated image signals, the latter are responsible for signals with 50 or 60 interlaced frames per second, the image encoder not generally being able to process 50 images per second without time sampling of the signal and in fact it only processes 10 images per second.

The images are compressed, transmitted and then decompressed to give a 10 Hz signal. In order to reconstitute the 50 or 60 Hz signal, each of the decoders 602 and 702 as they receive the informations (as from the authorization of decoding, i.e. at time $t_0$) in each case fill an image memory 604 or 704; as soon as said image is decoded, namely image I1, said image is read N times or five or six times by the display means; during the preceding reading operation, each of the decoders fills the second image memory 605 (705) corresponding to the following decoded image I2 and then, when said operation is finished, it is read five or 6 times, etc.

Thus, each decoder has two image or picture memories which it alternatively filled with images decoded at 10 Hz. These two memories are also alternately read five times or six times by the display means. The time taken by each decoding for filling each picture memory is variable, because it is dependent on the content of the coded image (all the blocks of the image not necessarily being coded), as well as the calculating power of the decoder. This time is less than the time taken for repeating N times said image (N = 5 or 6). The time taken for decoding the "black and white" signal is $\theta$. The time taken for the decoding of the color signal generally takes a shorter time $\theta'$.

According to this example, each image is repeated five times and I1, I2, etc. represents the succession of images at 10 Hz. The times A, B, C, etc. represent the times where the display system is authorized to display a new image. The display frequency is 50 Hz, the first image being displayed five times during the time AF. During this time, the decoder 602 decodes the following image I2 for a time AX, which is not necessarily equal to AF. It is dependent on the content of the image and the calculating power of the decoder. The variable delay method makes it possible to display at the end of the time $\theta + \theta_1$, i.e. at time F because AX<AF.

The first image is repeated five times, but another image could be repeated four times in the case where e.g. AX<AE. Thus, there is a variable time $\theta_i$ or $\theta'_1$, or $\theta_2$ as a function of the case and advantage can be taken of this for absorbing the phase displacement between the 64 kbit channels C1 and C2.

In the example given, the color inage could be displayed from time E. However, it is of greater interest not to do this and to wait for the time F, so as to present on the screen the new "black and white" image at the same time as the new color inage. The delay introduced into the color decoding does not represent a major disadvantage. Thus, when the color decoder 702 is doing nothing, the color informations arriving on the transmission line are accumulated in the buffer 701, which is chosen as a function of this.

The reading-writing switching from memory 604 to memory 605 and from memory 704 to memory 705 takes place at time $t_1$ and another switching takes place at time $t_2$.

The second example takes account of the fact that the color signal represents approximately 15% of the luminance signal after coding, the division of the two channels C1 and C2 into 64 kbit/s for the luminance and 32 or 48 kbit/s for the chrominance (32 or 16 kbit/s for vision) does not reflect the preceding percentage.

Thus, whilst remaining within the scope of the invention, it is proposed to transmit more color images than "black and white" images if, as in the previous example, the luminance imaes are transmitted at a frequency FN = 10 Hz (one image out of five or 6), whereby the chrominance inages can be transmitted at a frequency F/Q either at 12.5, or at 16.66, or at 25, or at 50 Hz (respectively 15, 20, 30 or 60 Hz).

The compensation of the phase displacement of the network is then only ensured on an average or mean basis. The luminance and chrominance inages or pictures which will be displayed in phase correspond to those which have been emitted in phase. For example, the luminance images are emitted on a base of 10 Hz and the chrominance images on a base of 25 Hz, as shown in FIG. 7.

The numbering of the images I1, I2, etc. respectively represents the succession of "black and white" images and color images at 50 Hz.

Thus, the luminance and chrominance images are presented in phase on every other occasion. The switching times take place at $t_0$, $t_1$ and $t_2$.

We claim:

1. Transmission-reception signal processor for the transmission of animated color pictures and sound from two independent channels, comprising in combination:

(A) a transmission assembly comprising (i) image processing means including camera means for generating luminance and chrominance signals, means for separating the luminance and chrominance signals, first encoding means for encoding the luminance signal, and second encoding means for encoding the chrominance signal; (ii) sound processing means comprising an encoding means for generating encoded sound signals; and (iii) a multiplexer for multiplexing the encoding chrominance signal and the encoded sound signal; and (B) a reception assembly comprising (i) a demultiplexer for demultiplexing the encoded chrominance and sound signals; (ii) decoding means for decoding the encoded luminance signal at a frequency F/N, said luminance signal decoding means comprising a first and a second image memories for alternatively storing the luminance signal corresponding to an image, and means for switching from one memory to another and reading said memory; (iii) decoding means for decoding the encoded chrominance signal at a frequency F/Q, where Q can be equal to N, said chrominance signal decoding means comprising a first and a second image memories for alternatively storing the chrominance signal corresponding to an image, and means for switching from one memory to another and reading said memory Q times; (iv) means for controlling switching from one memory to the other for reading the following decoding of the luminance and chrominance signals in phase corresponding to those which have been emitted in phase; (v) a mixer for mixing the decoded luminance and chrominance signals; (vi) sound processing means for decoding the encoded sound signals; and (vii) display means for displaying said mixed decoded luminance and chrominance signals, and said decoded sound signals.

2. Signal processor according to claim 1, wherein F and Q are equal, and the number of "black and white" images emitted corresponds to the number of color images emitted.

3. Signal processor according to claim 2, wherein F and Q are different, and the number Q exceeds the number F such that the number of emitted color images exceeds the number of "black and white" images emitted.

4. Signal processor according to claim 1, wherein the rate of the signals on each channel is 64 kbit/s.

5. Signal processor according to claim 1, wherein the total bit rate of the channel carrying the chrominance signal and the sound signal is distributed to provide 32 kbit/s for the chrominance signal and 32 kbit/s for the vision signal.

6. Signal processor according to claim 1, wherein the total bit rate of the channel carrying the chrominance signal and the sound signal is distributed to provide 48 kbit/s for the chrominance signal and 16 kbit/s for the vision signal.

* * * * *